United States Patent
Koizumi et al.

(10) Patent No.: US 9,305,670 B2
(45) Date of Patent: Apr. 5, 2016

(54) TIP SYSTEM AND TIP MONITORING CONTROL EQUIPMENT

(75) Inventors: Atsuhiko Koizumi, Tokyo (JP); Tsuyoshi Masugi, Tokyo (JP); Osamu Takizawa, Tokyo (JP); Naoto Odagawa, Tokyo (JP); Masataka Yanagisawa, Tokyo (JP); Toshifumi Sato, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 202 days.

(21) Appl. No.: 13/493,599

(22) Filed: Jun. 11, 2012

(65) Prior Publication Data

US 2012/0321028 A1 Dec. 20, 2012

(30) Foreign Application Priority Data

Jun. 17, 2011 (JP) ................. 2011-134699

(51) Int. Cl.
*G21C 17/00* (2006.01)
*G21D 3/00* (2006.01)
*G21C 17/108* (2006.01)
*G21C 17/10* (2006.01)

(52) U.S. Cl.
CPC ............ *G21D 3/001* (2013.01); *G21C 17/10* (2013.01); *G21C 17/108* (2013.01); *Y02E 30/40* (2013.01)

(58) Field of Classification Search
CPC ....... G21C 7/36; G21C 17/104; G21C 17/108
USPC ......................................... 376/254
See application file for complete search history.

(56) References Cited

U.S. PATENT DOCUMENTS

| 4,652,419 A | * | 3/1987 | Fukushima et al. | 376/254 |
| 5,930,317 A | * | 7/1999 | Kono | 376/259 |
| 6,236,698 B1 | * | 5/2001 | Hirukawa et al. | 376/255 |
| 6,408,041 B2 | | 6/2002 | Hirukawa | |

(Continued)

FOREIGN PATENT DOCUMENTS

| JP | 61-091597 A | 5/1986 |
| JP | 62-056898 A | 3/1987 |

(Continued)

OTHER PUBLICATIONS

Machine translation of JP-2000-028782.*

(Continued)

*Primary Examiner* — Jack W Keith
*Assistant Examiner* — Sharon M Davis
(74) *Attorney, Agent, or Firm* — Foley & Lardner LLP

(57) ABSTRACT

A TIP monitoring control equipment has: a process computer, a TIP control panel, and data transmitting unit. The process computer includes a operation input unit, a TIP scanning unit, a first TIP level data transmitting and receiving unit, and a TIP level data storage unit. To a first TIP level data transmitting and receiving unit, an LPRM level signal, an APRM level signal and TIP level data accumulated in the TIP control panel are input in synchronization with a TIP position signal. The TIP control panel includes a TIP driving control unit, a TIP level processing unit, a TIP position processing unit, a TIP level data accumulation unit and a second TIP level data transmitting and receiving unit. The second TIP level data transmitting and receiving unit transmits TIP level data accumulated in the TIP level data accumulation unit to the process computer via the data transmission unit.

4 Claims, 16 Drawing Sheets

(56) References Cited

U.S. PATENT DOCUMENTS

| | | |
|---|---|---|
| 6,456,681 B1 * | 9/2002 | Goto et al. .................... 376/254 |
| 6,633,622 B2 | 10/2003 | Kuribayashi et al. |
| 6,744,840 B2 | 6/2004 | Karino et al. |
| 2002/0122522 A1 | 9/2002 | Goto et al. |
| 2002/0126790 A1 * | 9/2002 | Kuribayashi et al. ......... 376/254 |
| 2003/0128793 A1 * | 7/2003 | Karino et al. ................. 376/254 |

FOREIGN PATENT DOCUMENTS

| | | |
|---|---|---|
| JP | 05-011278 B2 | 2/1993 |
| JP | 05-312991 A | 11/1993 |
| JP | 2000-028782 A | 1/2000 |
| JP | 2000-147187 A | 5/2000 |
| JP | 2001-099979 A | 4/2001 |
| JP | 2002-181987 A | 6/2002 |
| JP | 2002-341083 A | 11/2002 |
| JP | 2003-172792 A | 6/2003 |
| JP | 2004-020250 A | 1/2004 |
| JP | 2005-134306 A | 5/2005 |
| JP | 2006-145417 A | 6/2006 |
| JP | 2010-164338 A | 7/2010 |

OTHER PUBLICATIONS

Forster, "In-Core Neutron Flux Instrumentation," IEEE Transactions on Nuclear Science, Dec. 1965, pp. 8-14.*

* cited by examiner

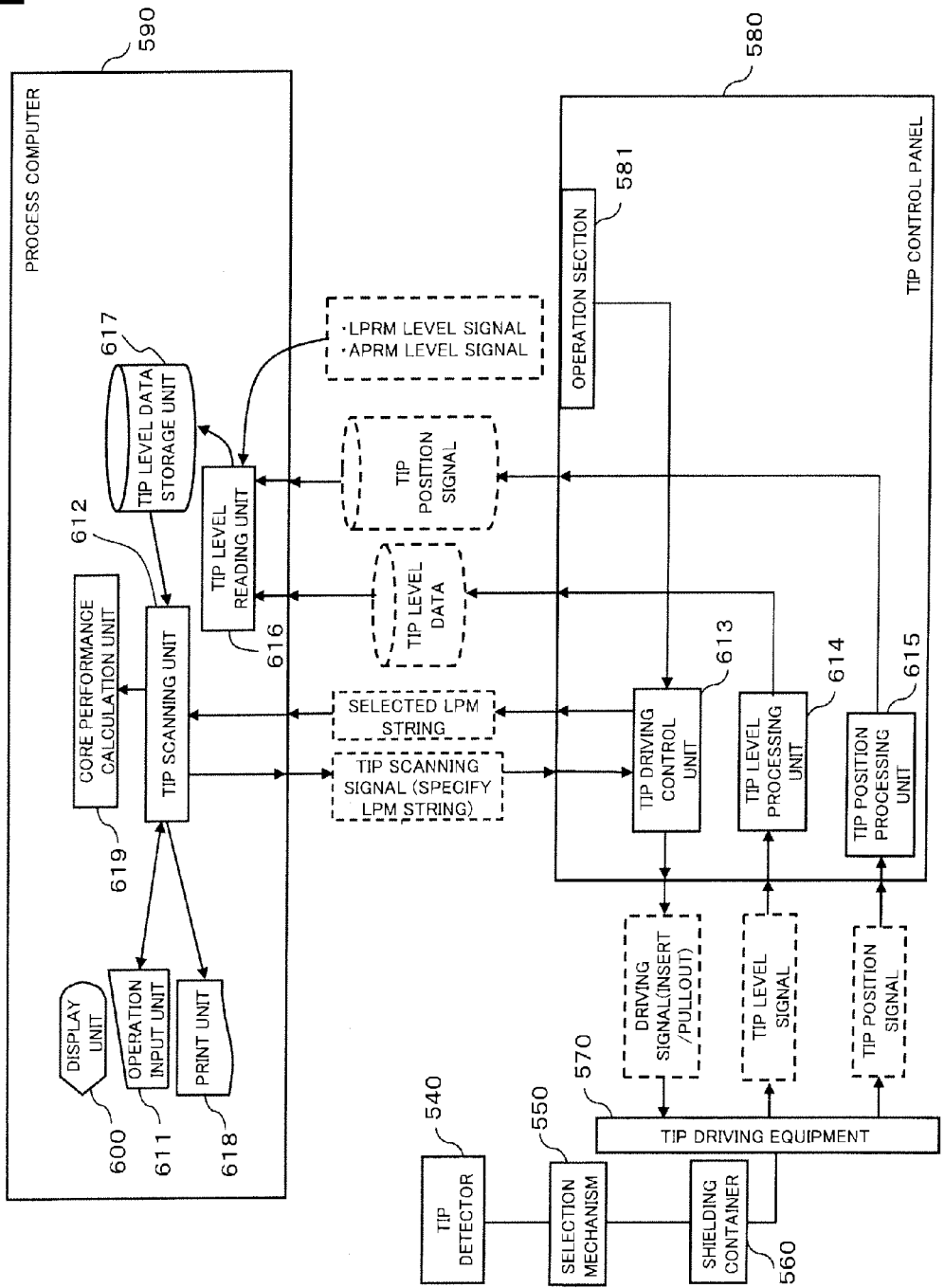

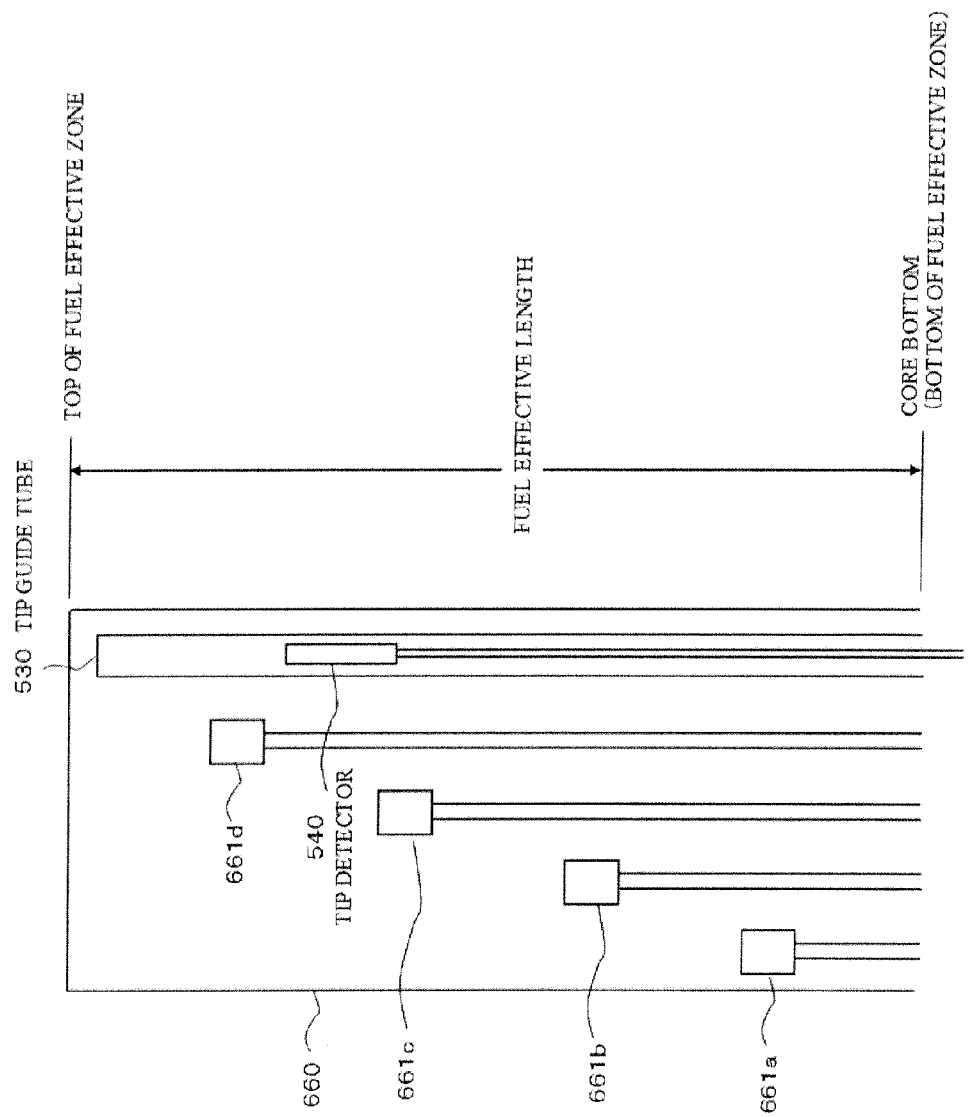

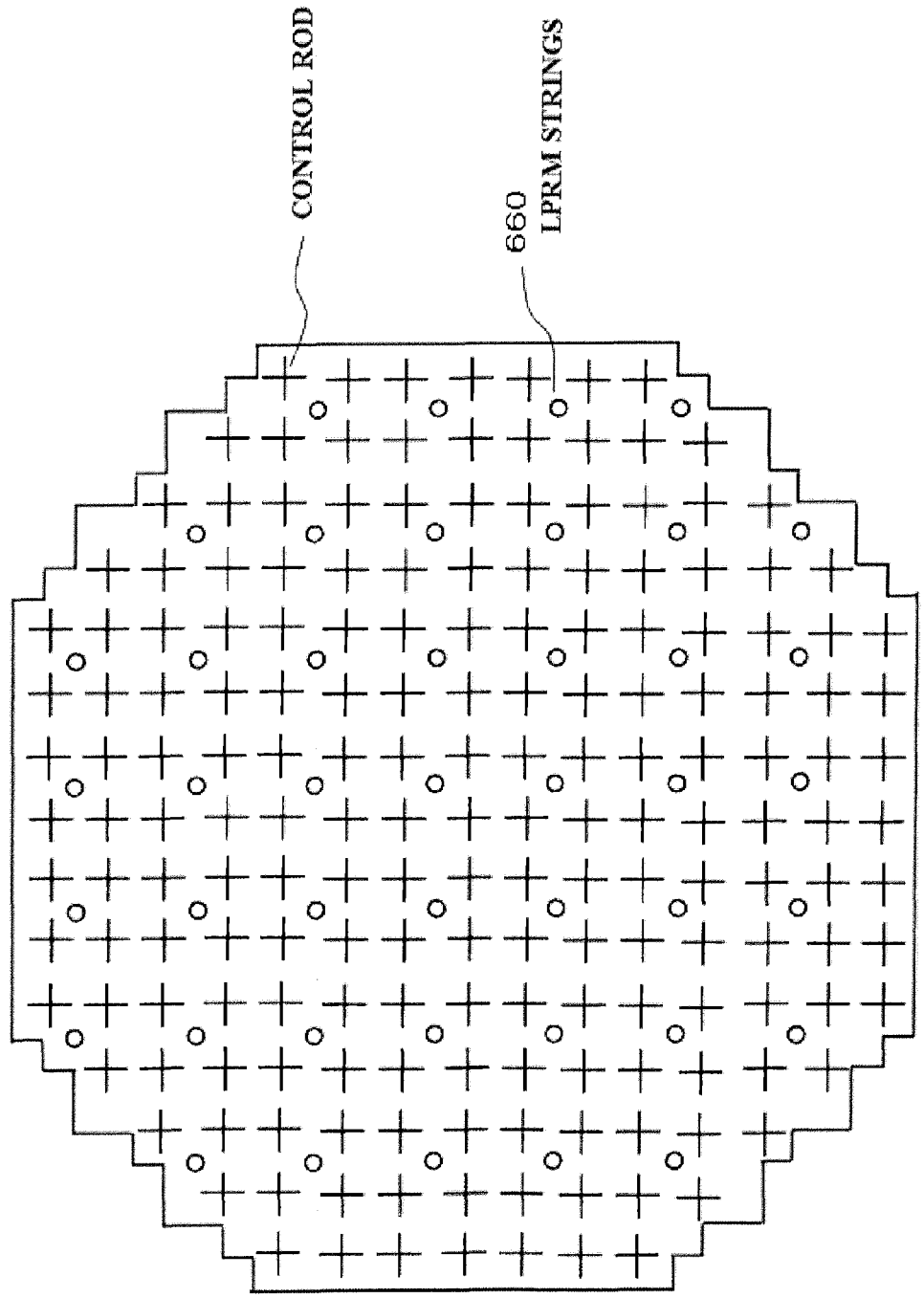

TIP SYSTEM AND TIP MONITORING CONTROL EQUIPMENT

CROSS REFERENCES TO RELATED APPLICATIONS

This application is based upon and claims the benefits of priority from the prior Japanese Patent Application No. 2011-134699, filed in the Japanese Patent Office on Jun. 17, 2011, the entire content of which is incorporated herein by reference.

FIELD

The present invention relates to a TIP monitoring control equipment, which is one portion of an in-reactor nuclear instrumentation system, and a TIP system containing the TIP monitoring control equipment.

BACKGROUND

A mobile in-core instrumentation equipment (referred to as "TIP (Traversing Incore Probe) system," hereinafter), which is one portion of an in-reactor nuclear instrumentation system in a boiling water reactor (BWR) nuclear power plant, is designed to measure a neutron flux level by moving a detector in an axial direction in a nuclear reactor when the nuclear power plant is in operation; obtain a reactor power distribution at each level of height in a direction of a core axis; and provide data that are used as a basis for calculating a reactor power distribution.

FIG. 13 is a block diagram showing an overall configuration of a conventional TIP system, as well as a nuclear reactor.

The TIP system transfers a TIP detector 540 into a plurality of TIP guide tubes 53, which are disposed in a reactor core 520 of a nuclear reactor 510. When the TIP detector 540 is pulled out from the top to the bottom of the reactor core 520, the TIP system generates a TIP position signal corresponding to a travel distance. In synchronization with the TIP position signal, the TIP system reads a TIP level signal, an LPRM level signal from a local power range monitor (referred to as "LPRM (Local Power Range Monitor)", hereinafter), and an APRM level signal from an average power range monitor (referred to as "APRM (Average Power Range Monitor)", hereinafter) to measure a neutron flux distribution of an in-core axial direction.

A process computer 590 and a TIP control panel 580 work together with each other and output a driving signal (insertion/pull-out signal for the detector) to a TIP driving equipment 570. Thereby, the TIP detector 540 is transferred.

In the TIP detector 540, the sensitivity thereof becomes attenuated by neutron radiation. Therefore, the TIP detector 540 is inserted into the nuclear reactor only when measurement takes place. When no measurement takes place, the TIP detector 540 is stored in a shielding container 560 outside of the nuclear reactor, thereby minimizing neutron radiation and preventing the attenuation of the detector's sensitivity.

FIG. 14 is a block diagram showing the configuration of a conventional TIP system, as well as signal processing.

Measuring a neutron flux level by the TIP system is performed in the following manner.

In a process computer 590, a display unit 600 and an operation input unit 611 are placed. An operator uses the above units to specify a TIP scanning signal (TIP scanning start/interrupt signal) and a TIP guide tube 530 (LPRM string) for which a neutron flux level is measured.

A signal input by the operator is processed by a TIP scanning unit 612 of the process computer 590, and then transferred to a TIP driving control unit 613 of a TIP control panel 580.

Moreover, on the TIP control panel 580, a TIP control panel operation section 581 is mounted. The operator is able to carry out an operation of making a driving request and a request of pull-out/insertion of the detector through a switch on the TIP control panel operation section 581. A TIP scanning signal from the process computer 590 is input into the TIP driving control unit 613, which outputs a driving signal (insertion/pull-out signal for the detector) to the TIP driving equipment 570.

Then, the TIP driving equipment 570 drives the TIP detector 540 in a direction corresponding to the driving signal.

Meanwhile, the neutron flux level measured by the TIP detector 540 is input, as a TIP level signal, into a TIP level reading unit 616 of the process computer 590 via a TIP level processing unit 614 of the TIP control panel 580.

Moreover, the height from the core top to core bottom of the TIP detector 540 is input, as a TIP position signal that is generated while the TIP detector 540 moves from the core top to the core bottom, into the TIP level reading unit 616 of the process computer 590 via a TIP position processing unit 615 of the TIP control panel 580.

The TIP level reading unit 616 of the process computer 590 reads a TIP level signal at a timing when the TIP position signal is turned ON (at a distance interval of an inch). Moreover, the TIP level reading unit 616 reads an LPRM level signal at timings of the core top and the core bottom, and an APRM level signal at timings of the core top, the core center and the core bottom; the signals are then stored in a TIP level data storage unit 617 of the process computer 590.

Then, the TIP data stored in the TIP level data storage unit 617 of the process computer 590 are displayed on the display unit 600 by the TIP scanning unit 612, and a log thereof is printed on a print unit 618. Moreover, the TIP data are transferred to a core performance calculation unit 619, where the TIP data are used as a basis for calculating a reactor power distribution.

FIG. 15 is a conceptual diagram of an axial-direction position of an assembly (referred to as "LPRM string", hereinafter) of local power range monitors (referred to as "LPRM", hereinafter).

LPRM strings are provided in the reactor core. Each of the LPRM strings contains one TIP guide tube 530 therein. Along an axial direction thereof, for each of the LPRM strings, four LPRM detectors "A", "B", "C" and "D" 661a, 661b, 661c and 661d, respectively are positioned and fixed.

FIG. 16 is a conceptual diagram of the arrangement of LPRM strings in the reactor core.

In the reactor core, a large number of LPRM strings are disposed. In the example of FIG. 16, the LPRM strings 660 are divided into five groups.

As for the TIP detectors 540, all the LPRM strings 600 are not covered by one TIP detector 540. In response to the above, five TIP detectors 540, "A", "B", "C", "D" and "E", are provided. Each of the TIP detectors 540 sequentially runs in about 10 LPRM strings.

An LPRM string 660 into which a TIP detector 540 is inserted is selected by rotating a rotating cylinder of a selection mechanism 550 shown in FIG. 13. At this time, selection is not made in such a way that a plurality of TIP detectors 540 are inserted into the same LPRM string 660.

Examples of related prior art documents are as follows: Jpn. Pat. Apple. Publication No. H05-11278, Jpn. Pat. Appln. Laid-Open Publication No. 2000-28782, Jpn. Pat. Appln.

Laid-Open Publication No. 2006-145417, and Jpn. Pat. Appln. Laid-Open Publication No. H05-312991.

According to the conventional TIP system, the TIP control panel is an analog circuit. Therefore, data cannot be accumulated, and a TIP level signal and a TIP position signal are output from the TIP control panel to the process computer without being processed or stored.

Then, in the process computer, what is performed is a process of reading a TIP level signal (analog signal), which appears at a time when a TIP position signal (pulse signal) is turned ON, synchronously as a TIP level at a height thereof. However, because of hardware constraints of the process computer, the ON time of the pulse signal requires about 100 milliseconds.

Therefore, the driving speed of the TIP detector cannot be increased over 3 inches per second, which is why a reduction in plant start-up time cannot be achieved in completing the measurement of the TIP levels of the entire reactor core. Thus, the measurement is completed for about 15 to 30 minutes.

Another problem is that, due to the transfer lag of a signal or the delay of a timing at which the process computer detects that the pulse signal is ON, the accuracy of reading the TIP level data is not sufficient.

Furthermore, as for the data that serve as a basis for calculating the reactor power distribution, in synchronization with a TIP position signal, an LPRM level signal and an APRM level signal need to be input. However, the TIP control panel exists independently of an LPRM panel and an APRM panel. Therefore, the problem is that it is not possible to input an LPRM level signal and an APRM level signal in synchronization with a TIP position signal on the TIP control panel.

The TIP level data that are read into the process computer are used as basic data, which are used to improve the accuracy of power-distribution calculation in a process of calculating the reactor core's performance. However, in a conventional TIP system, it takes about one to two hours to measure the TIP levels of all the LPRM strings in the reactor core. Accordingly, during a process of measuring the TIP levels, there are changes in the states of the plant, which, for example, include a reactor thermal power, a core flow rate, a control-rod position, and the like. Thus, it is not possible to input TIP level data that accurately reflect the current power distribution. The problem is that the accuracy of calculating the reactor power distribution can deteriorate.

In the conventional TIP system, on the TIP control panel, a TIP level at a common guide tube (common string) is plotted by a mechanical pen recorder. From a chart of the pen recorder, the TIP level is read visually; the values of calibration current of the TIP detectors are adjusted (Gain adjustment) so as to have the same TIP level between each TIP detector at the common string. However, the accuracy of reading the TIP levels visually from the chart of the mechanical pen recorder is not sufficient. Another problem is that it takes a lot of time and effort for an operator to manually adjust the values of calibration current.

Moreover, in the conventional TIP system, the value of calibration current on the TIP control panel is confirmed before the deterioration of a TIP detector is assessed. Therefore, the problem is that it is difficult to determine the long-term trend of TIP deterioration, and to plan a replacement time of the TIP detector accurately.

Furthermore, in the conventional TIP system, between the TIP control panel and the process computer, as for each TIP, I/O cables are required for a TIP level signal, a TIP position signal, and the information about a selected LPRM string, i.e. a channel number, a contact signal associated with whether or not a TIP detector exists at a specific position such as the core bottom or top, or any other signal. A total of, for example, 135 cables are required for five TIP detectors. If the distance between the TIP control panel and the process computer is 100 m, the total length of the cables amounts to about 13 km. In this manner, large amount of cables are required.

BRIEF DESCRIPTION OF THE DRAWINGS

FIG. 14 is a block diagram showing the configuration of a conventional TIP system, as well as signal processing;

FIG. 15 is an explanatory diagram showing the concept of axial-direction positions of LPRM strings (an LPRM assembly and a TIP guide tube); and FIG. 16 is an explanatory diagram showing the concept of an in-core arrangement of LPRM strings.

DETAILED DESCRIPTION

Figure 1:
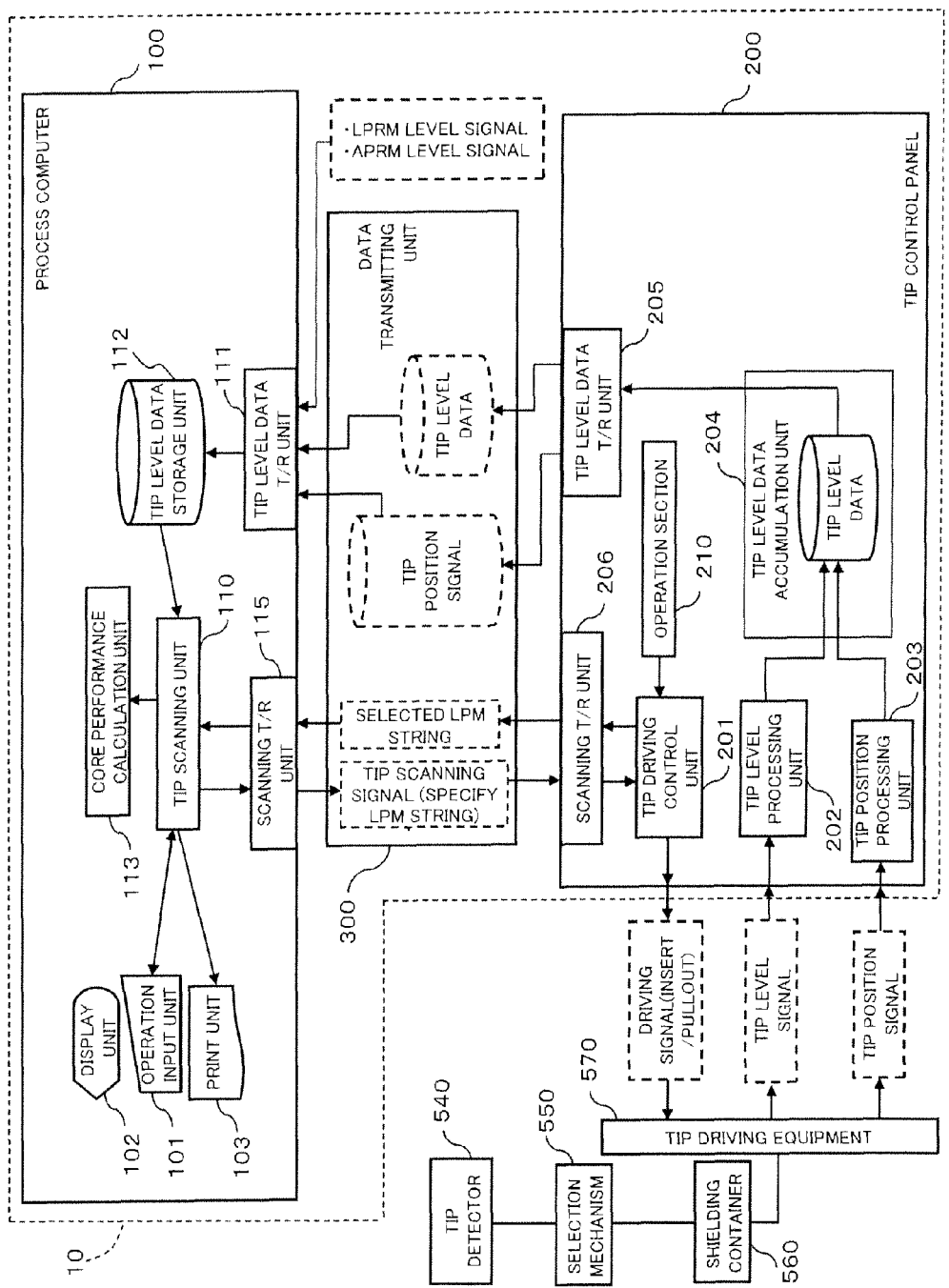
FIG. 1 is a block diagram showing the configuration of a first embodiment of a TIP system according to the present invention.

In view of the above-identified problem, the object of the present invention is to make high-speed running possible, while ensuring the same level of accuracy as the conventional one, without being affected by a driving time of a TIP detector, a transfer lag of a signal, a delay of a timing at which a process computer detects that a pulse signal is ON, or the like, as well as to reduce the amount of cables.

According to an embodiment, there is provided a TIP monitoring control equipment comprising: a process computer, a TIP control panel, and a data transmission unit, wherein the process computer includes: a TIP scanning unit that receives a TIP scanning request instruction and outputs a TIP scanning signal, a first TIP level data transmitting and receiving unit to which an LPRM level signal, an APRM level signal and TIP level data accumulated in the TIP control panel are input in synchronization with a TIP position signal, and a TIP level data storage unit that stores the TIP level data; the TIP control panel includes: a TIP driving control unit that accepts the TIP scanning signal as an input and outputs a driving signal to a TIP driving equipment, a TIP level processing unit to which a TIP level signal from the TIP driving equipment is input, a TIP position processing unit to which a TIP position signal from the TIP driving equipment is input, a TIP level data accumulation unit to which a TIP level signal is input in synchronization with a TIP position signal and in which TIP level data are accumulated, and a second TIP level data transmitting and receiving unit that transmits TIP level data accumulated in the TIP level data accumulation unit to the process computer via the data transmission unit.

According to another embodiment, there is provided a TIP system comprising: a plurality of TIP detectors, a selection mechanism that sequentially selects one of a plurality of TIP guide tubes for each of the TIP detectors, a shielded container in which the TIP detectors are stored in any time other than a measurement period of the TIP detectors, a TIP driving equipment that drives the insertion and pullout of the TIP detectors into the TIP guide tubes, and a TIP monitoring control equipment, wherein the TIP monitoring control equipment has: a process computer, a TIP control panel, and a data transmission unit, the process computer including: a TIP scanning unit that receives a TIP scanning request instruction and outputs a TIP scanning signal, a first TIP level data transmitting and receiving unit to which an LPRM level signal, an APRM level signal and TIP level data accumulated in the TIP control panel are input in synchronization with a TIP position signal, and a TIP level data storage unit that stores the TIP level data; the TIP control panel including: a TIP driving control unit that accepts the TIP scanning signal as an input and outputs a driving signal to the TIP driving equipment, a TIP level processing unit to which a TIP level signal from the TIP driving equipment is input, a TIP position processing unit to which a TIP position signal from the TIP driving equipment is input, a TIP level data accumulation unit to which a TIP level signal is input in synchronization with a TIP position signal and in which TIP level data are accumulated, and a second TIP level data transmitting and receiving unit that transmits TIP level data accumulated in the TIP level data accumulation unit to the process computer via the data transmission unit, wherein the second TIP level data transmitting and receiving unit transmits TIP level data accumulated in the TIP level data accumulation unit to the process computer.

Hereinafter, with reference to the accompanying drawings, embodiments of a TIP system of the present invention will be described. The same or similar portions are represented by the same reference symbols, and the same descriptions will not be repeated herein.

[First Embodiment]

FIG. 1 is a block diagram showing the configuration of a first embodiment of a TIP system of the present invention.

As shown in FIG. 1, a TIP system of the present embodiment includes a TIP detector 540, a selection mechanism 550, a shielding container 560, a TIP driving equipment 570, and a TIP monitoring control equipment 10.

The TIP monitoring control equipment 10 includes a process computer 100, a TIP control panel 200, and a data transmitting unit 300.

First, the process computer 100 will be described.

The process computer 100 includes an operation input unit 101, a display unit 102, a print unit 103, a TIP scanning unit 110, a TIP level data transmitting and receiving (T/R) unit 111, and a TIP level data storage unit 112.

The operation input unit 101 is a portion where an operator carries out an interactive operation. The TIP scanning unit 110 performs a TIP scanning process in response to a TIP scanning request from the operator, and outputs a TIP scanning signal to the TIP control panel 200.

The operator carries out an interactive operation through the operation input unit 101 of the process computer 100. In response to a TIP scanning request from the operator, the TIP scanning unit 110 performs a TIP scanning process.

TIP level data accumulated in the TIP control panel 200 and a current TIP position signal are input to the TIP level data T/R unit 111 via the data transmitting unit 300.

Moreover, an LPRM level signal and an APRM level signal are also input to the TIP level data T/R unit 111 in synchronization with a TIP position signal, and are stored in the TIP level data storage unit 112.

The following describes the TIP control panel 200.

The TIP control panel 200 includes a TIP driving control unit 201, a TIP level processing unit 202, a TIP position processing unit 203, a TIP level data accumulation unit 204, and a TIP level data transmitting and receiving (T/R) unit 205.

A TIP scanning signal from the process computer 100 is input to the TIP driving control unit 201. The TIP driving control unit 201 outputs a driving signal to the TIP driving equipment 570.

To the TIP level processing unit 202, a TIP level signal from the TIP driving equipment 570 is input. The TIP level processing unit 202 converts an analog signal to a digital signal, and outputs the digital signal to the TIP level data accumulation unit 204 in which the digital signal is stored.

To the TIP position processing unit 203, a TIP position signal from the TIP driving equipment 570 is input. The TIP position processing unit 203 converts an analog signal to a digital signal, and outputs the digital signal to the TIP level data accumulation unit 204 in which the digital signal is stored.

To the TIP level data accumulation unit 204, the TIP position signal is input, and the TIP level signal is also input in synchronization with the TIP position signal. In the TIP level data accumulation unit 204, TIP position data and TIP level data are accumulated as digital signals.

The TIP level data accumulation unit 204 outputs each piece of the above information, which is held as digital information, to the TIP level data T/R unit 205.

In conjunction with the TIP level data T/R unit 111, the TIP level data T/R unit 205 enables each set of the above data output from the TIP level data accumulation unit 204 to be transmitted by the data transmitting unit 300 having a network configuration, such as Ethernet (Registered Trademark).

Although not shown in the diagram, besides the above TIP position signal and TIP level signal, from the TIP driving equipment 570 to the TIP control panel 200, the information about a selected LPRM string, i.e. a channel number, a contact signal associated with whether or not a TIP detector exists at a specific position such as the core bottom or top, or any other signal, is output. The above signals are received by the TIP driving control unit 201, and are then transmitted by a network via the data transmitting unit 300 between the a scanning transmitting and receiving (T/R) unit 206 and a scanning transmitting and receiving (T/R) unit 115.

The following describes the data transmitting unit 300.

The data transmitting unit 300 has a signal transmission function of receiving the TIP level data and TIP position signal output from the TIP level data T/R unit 205 of the TIP control panel 200, and transmitting the TIP level data and TIP position signal to the TIP level data T/R unit 111 of the process computer 100.

For the data transmitting unit 300 that transmits the TIP level data and the TIP position signal, which are digital signals, a hub or the like is used, for example.

A normal operation of the present embodiment will be described below.

The process computer 100 is equipped with the operation input unit 101. An operator uses the operation input unit 101 to make a request for a TIP scanning signal (scanning start/interrupt signal), or to specify a TIP guide tube 530 for which a neutron flux level is measured.

A signal requested and specified by the operator is processed by the TIP scanning unit 110 of the process computer 100 before being output to the TIP driving control unit 201 of the TIP control panel 200.

On the TIP control panel 200, an operation section 210 is provided. Through a switch on the operation section 210, the operator can carry out an operation of making a driving request and a pull-out/insertion request to the detector. Based on a TIP scanning signal from the process computer 100 or an instruction from the operation section 210, the TIP driving control unit 201 outputs a driving signal (insertion/pull-out signal for the detector) to the TIP driving equipment 570.

The TIP driving equipment 570 drives the TIP detector 540 in a direction corresponding to the driving signal.

Meanwhile, the neutron flux level measured by the TIP detector 540 is input, as a TIP level signal, to the TIP level data accumulation unit 204 of the TIP control panel 200 via the TIP level processing unit 202 of the TIP control panel 200.

The height from the core top to core bottom of the TIP detector 540 is input, as a TIP position signal that is generated as the TIP detector 540 is inserted from the core bottom to the core top and pulled out of the core top to the core bottom, to the TIP level data accumulation unit 204 via the TIP position processing unit 203 of the TIP control panel 200.

The TIP level data accumulation unit 204 reads a TIP level signal in synchronization with a TIP position signal, and stores the TIP level signal as TIP level data.

The TIP level data stored in the TIP level data accumulation unit 204 is handed over from the TIP level data T/R unit 205 to the TIP level data T/R unit 111 of the process computer 100 via the data transmitting unit 300 at a time when the scanning of each string is completed.

The TIP position signal stored in the TIP level data accumulation unit 204 is constantly handed over from the TIP level data T/R unit 205 of the TIP control panel 200, in order to be synchronized with an LPRM level signal and an APRM level signal, to the TIP level data T/R unit 111 of the process computer 100 via the data transmitting unit 300.

The TIP level data input to the TIP level data T/R unit 111 of the process computer 100 becomes synchronized with the LPRM level signal and the APRM level signal before being stored in the TIP level data storage unit 112 of the process computer 100.

Measurement data stored in the TIP level data storage unit 112 of the process computer 100 are displayed on the display unit 102 by the TIP scanning unit 110, and a log thereof is printed on the print unit 103. Moreover, the measurement data are transferred to a core performance processing unit 113, where the measurement data are used as a basis for calculating a reactor power distribution.

Here, the TIP level data accumulation unit 204 of the TIP control panel 200 needs to perform a process of accumulating TIP level data at high speed in order to make it possible to increase the driving speed of the TIP detector 540 and detect the position with a high degree of accuracy at intervals of 0.1 inch. Therefore, it is necessary to form the TIP level data accumulation unit 204 independently of the TIP driving control unit 201 of the TIP control panel 200. The description thereof will be provided below.

Figure 2:
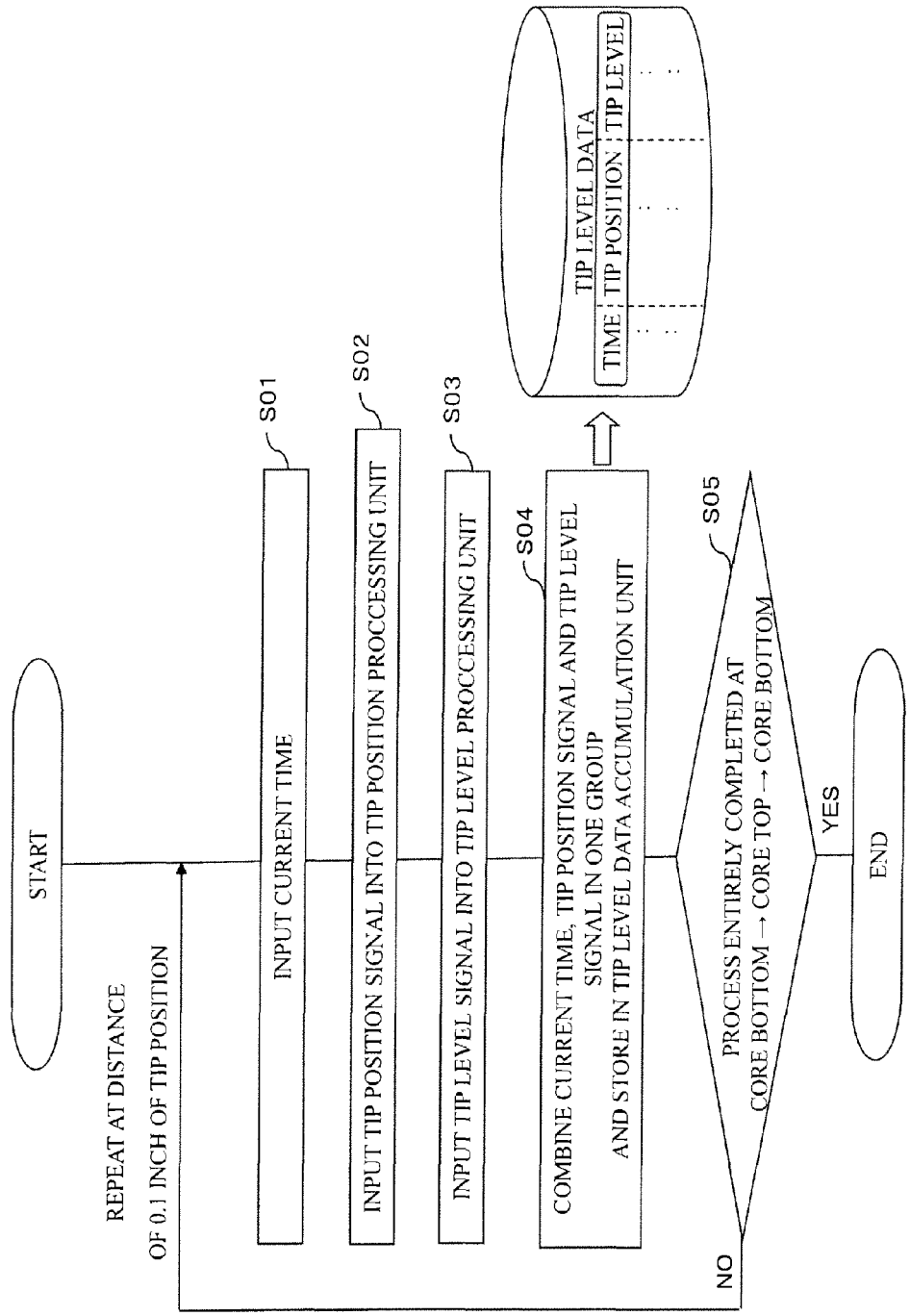
FIG. 2 is a flowchart showing the flow of a process by a TIP level data accumulation unit according to the first embodiment.

FIG. 2 is a flowchart showing the flow of a process by the TIP level data accumulation unit according to the present embodiment.

Figure 3:
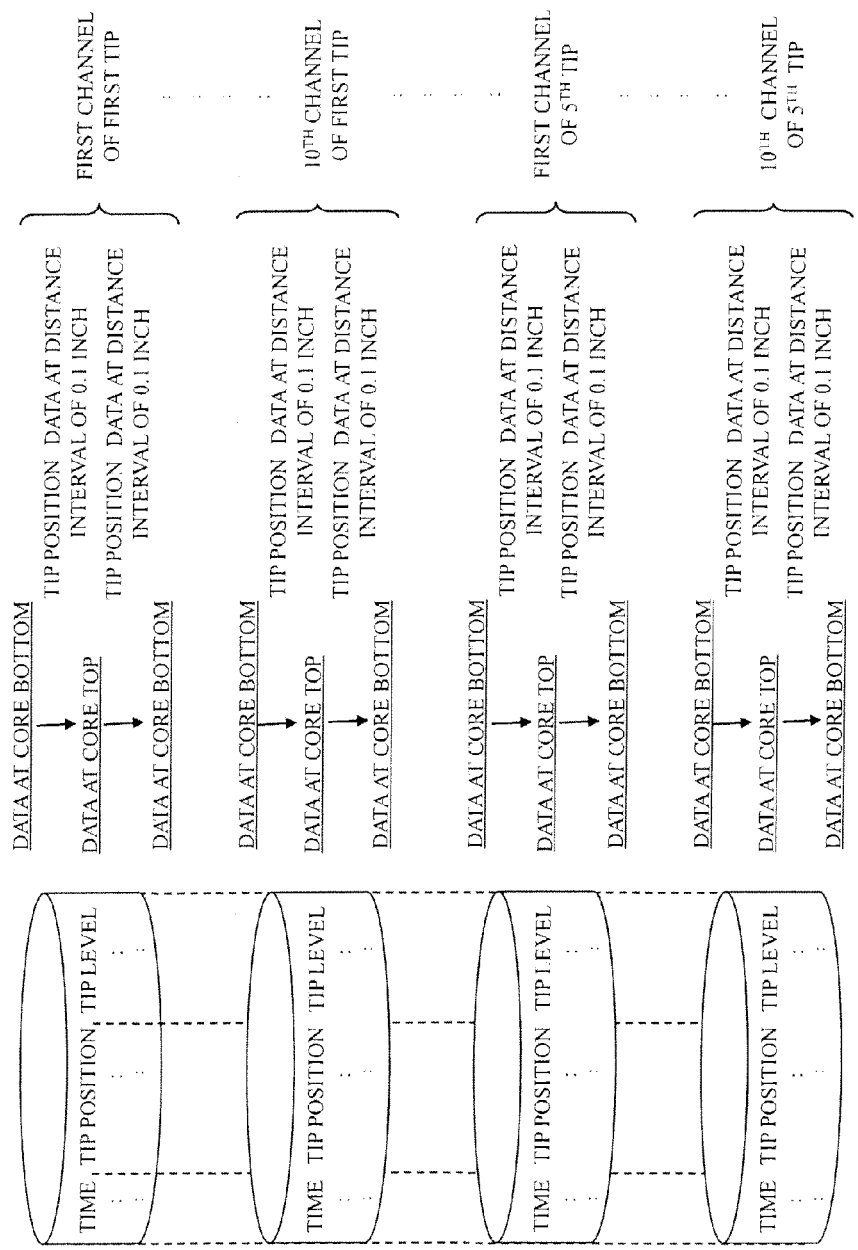
FIG. 3 is an explanatory diagram showing the configuration of TIP level data according to the first embodiment.

FIG. 3 is an explanatory diagram showing the configuration of TIP level data according to the present embodiment.

In the TIP level data accumulation unit 204, after the measurement of a TIP level starts, the current time, a TIP position and a TIP level are simultaneously input during a period of time when the TIP detector 540 is inserted from the core bottom to the core top and during a period of time when the TIP detector 540 is pulled out of the core top to the core bottom. The above three sets of data are packaged into one group, which is then stored in TIP level data.

That is, as shown in FIG. 2, measurement starts to take place from the core bottom, and the current time is input (Step S01). A TIP position signal is input into the TIP position processing unit 203 (Step S02). A TIP level signal is input into the TIP level processing unit 202 (Step S03). The above current time, TIP position and TIP level are combined in one group before being stored in the TIP level data accumulation unit 204 (Step S04).

As shown in FIG. 2, while a confirmation is being made as to whether the TIP detector is in an insertion state, which is from the core bottom to the core top, or in a pull-out state, which is from the core top to the core bottom (Step S05), the process is repeated every 0.1 inch as a TIP position. After it is determined that the TIP detector has returned to the core bottom, the process comes to an end.

The TIP level data stored in the TIP level data accumulation unit 204 are stored, as shown in FIG. 3, as to No. 01 to No. 10 channels for each of first to fifth TIP detectors.

The TIP level data T/R unit 111 of the process computer 100 needs to perform a process of receiving a TIP position signal from the data transmitting unit 300 at high speed in order to make it possible to read an LPRM level signal and an APRM signal in synchronization with the TIP position signal. And, it is necessary to form the TIP level data T/R unit 111 independently of the TIP scanning unit 110 of the process computer 100.

Figure 4:
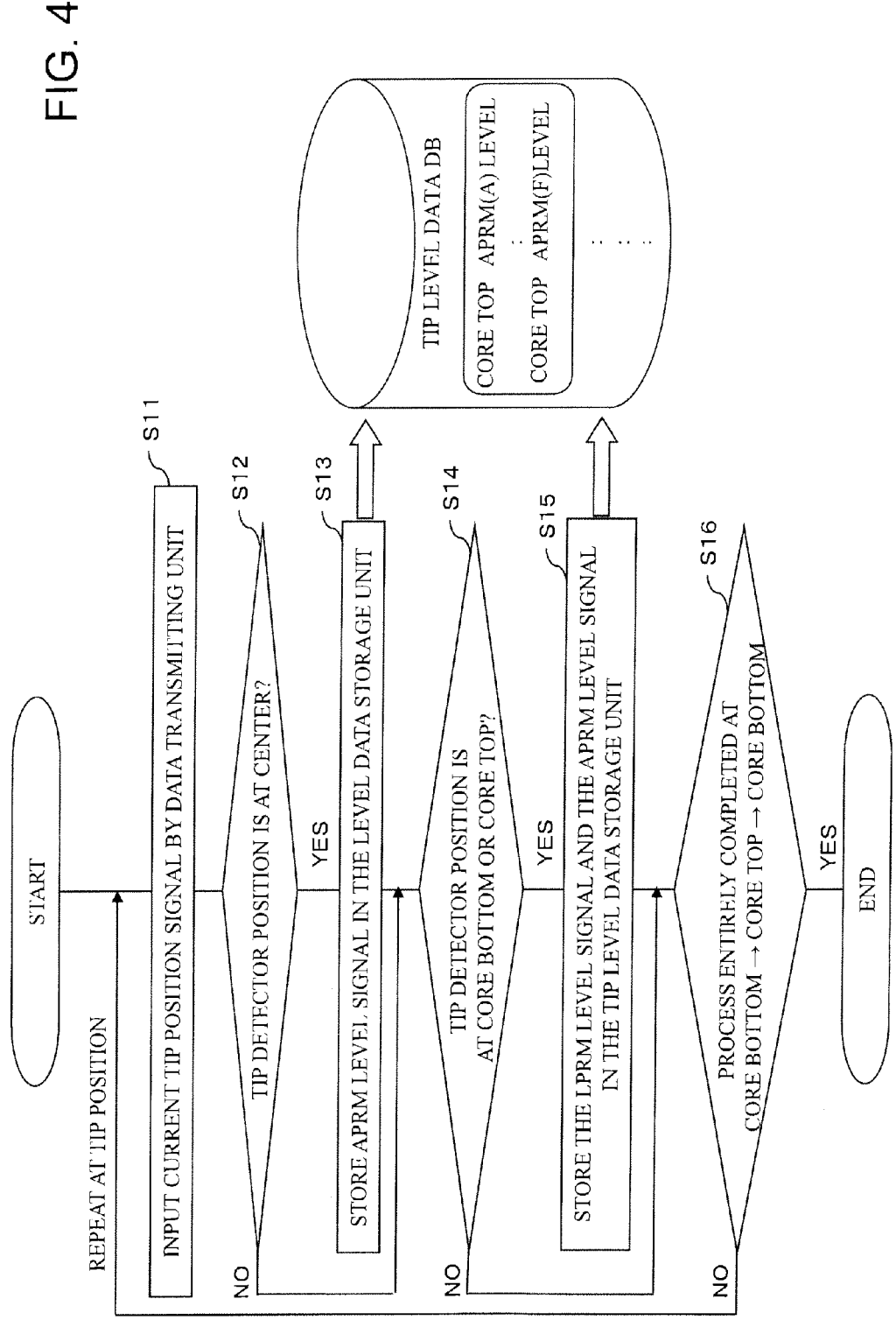
FIG. 4 is a flowchart showing the flow of a process of reading an LPRM level signal and an APRM level signal of a TIP level data transmitting and receiving unit according to the first embodiment.

FIG. 4 is a flowchart showing the flow of a process by the TIP level data T/R unit 111 of reading an LPRM level signal and an APRM level signal according to the present embodiment.

The current position of the TIP detector 540 is input by the data transmitting unit 300 (Step S11). A determination is made as to whether the position of the TIP detector 540 is the center of the core (Step S12). If the determination result is YES, an APRM level signal is stored in the TIP level data storage unit 112 (Step S13) before the process proceeds to the next step S14. If the determination result is NO at step S12, the process just proceeds to the next step S14.

Then, a determination is made as to whether or not the position of the TIP detector 540 is the core bottom or the core top (Step S14). If the determination result is YES, the LPRM level signal and the APRM level signal are stored in the TIP level data storage unit 112 (Step S15), and the process subsequently proceeds to the next step S16. If the determination result is NO at step S14, the process just proceeds to the next step S16.

While a confirmation is being made as to whether the TIP detector 540 is in an insertion state, which is from the core bottom to the core top, or in a pull-out state, which is from the core top to the core bottom (Step S16), the above operations are repeated at high speed for each TIP position. The process eventually comes to an end after it is determined that the TIP detector 540 has returned to the core bottom.

The TIP level data T/R unit 111 makes a determination, from the current TIP position signal, as to whether the TIP detector 540 is positioned at the core bottom, core center, or core top; the LPRM level signals and APRM level signals of corresponding heights are stored in the TIP level data storage unit 112. The above determination process is repeated at high speed. The LPRM levels and APRM levels stored in the TIP level data storage unit 112 are stored for all channels of each TIP detector 540.

As described above, according to the present embodiment, the TIP level signals and the TIP position signals are synchronously collected by the TIP level data accumulation unit 204 of the TIP control panel 200. Moreover, the TIP position signals are constantly transmitted from the TIP control panel 200 to the process computer 100. Therefore, the LPRM level signals and the APRM signals are collected also by the process computer 100 in synchronization with the TIP position signals.

As a result, without being constrained by the driving time of the TIP detector 540 due to the hardware of the process computer 100, and without being affected by a transfer lag of a signal, a delay of a timing at which the process computer 100 detects that the pulse signal is ON, or the like, the TIP driving speed can be raised. Moreover, it is possible to measure the TIP level signals in synchronization with the TIP position signals without error.

Moreover, the LPRM level signals and the APRM level signals, which are required as basic data for calculation of a reactor power distribution, can be input in synchronization with the TIP position signals with the same degree of accuracy as a conventional one.

As for the degree of effectiveness, since a multitask having a large number of functions, i.e. a variety of programs, is executed by the process computer, there is a limit on a high-speed reading performance of a TIP position pulse of a task. It is possible to move the TIP detector only at a speed of three inches per second (76.2 mm).

Meanwhile, according to the present embodiment, in the TIP control panel 200, which is a dedicated equipment, the TIP level signals and the TIP position signals are synchronized and turned into data before being output to the process computer 100. Therefore, without being affected by the high-speed reading performance limitations of a TIP position pulse of the process computer, it is possible to increase the speed of the TIP detector with the performance of the TIP control equipment's side.

For example, suppose that, with the driving performance of the TIP driving equipment 570, it is basically possible to move the TIP detector at a speed of 12 inches (304.8 mm) per second. In this case, without being affected by conventional constraints, the driving can be carried out at the above speed. A simple estimation reveals that the speed can be quadrupled. In that case, it takes about 15 to 30 minutes to complete, whereas a conventional method requires one to two hours in measuring all strings.

Furthermore, for each string, a TIP reading value data package can be created in synchronization with the position of the TIP detector 540. As a transmission interface, a transmission mechanism that uses hubs and Ethernet is provided, for example. As a result, instead of about 13 kilometers of metal I/O cables that are required for inputting and outputting of a TIP level signal, a TIP position signal and the like between the process computer 100 and the TIP control panel 200, what is required is only one network cable, which is for example a twisted pair cable. As a result, it is possible to significantly reduce the amount of cables.

[Second Embodiment]

Figure 5:
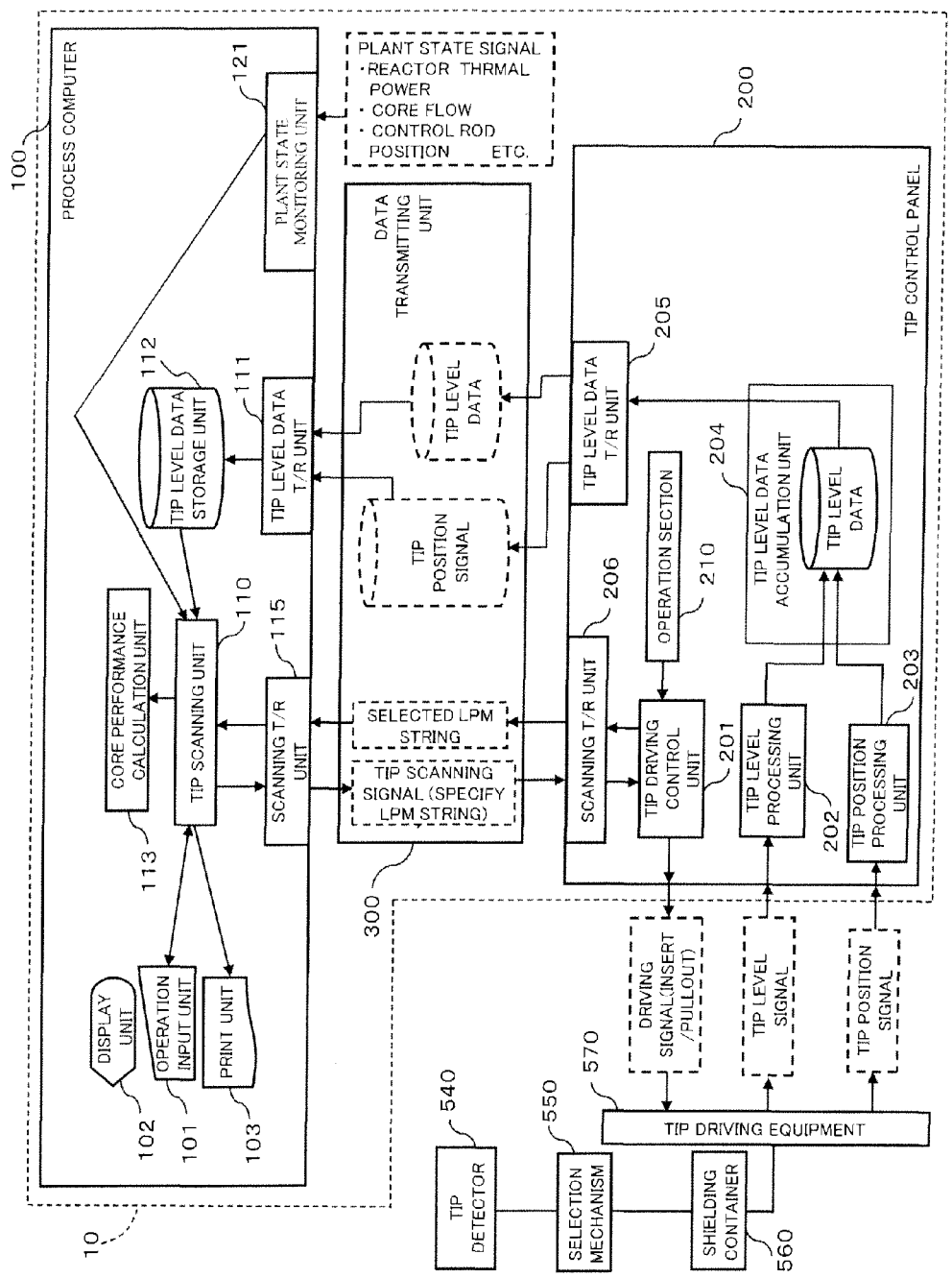
FIG. 5 is a block diagram showing the configuration of a second embodiment of a TIP system according to the present invention.

FIG. 5 is a block diagram showing the configuration of a second embodiment of a TIP system of the present invention.

The TIP system of the present embodiment is a variant of the first embodiment. The process computer 100 includes a plant state monitoring unit 121. To the plant state monitoring unit 121, a plant state signal and an output from the TIP level data storage unit 112 are input. The plant state monitoring unit 121 outputs a result of a calculation process of stability diagnosis to the TIP scanning unit 110.

The other components are substantially the same as those in the first embodiment.

The following describes an operation of the present embodiment.

A scanning start request or scanning termination request input by an operator via the operation input unit 101 of the process computer 100 is processed by the TIP scanning unit 110 of the process computer 100, and is output to the TIP driving control unit 201 of the TIP control panel 200, as well as to the plant state monitoring unit 121 in parallel.

The plant state monitoring unit 121 takes in a plant state signal, which includes a reactor thermal power, a core flow rate, a control-rod position and the like. When a scanning start request is input from the TIP scanning unit 110, the plant state monitoring unit 121 starts monitoring. When trouble is detected in the state of the plant, a scanning interrupt request is output to the TIP scanning unit 110, and the detection information thereof is issued to the operator through the operation input unit 101.

After receiving a scanning termination signal from the TIP scanning unit 110, the plant state monitoring unit 121 stops monitoring.

In this case, as for the monitoring of the state of the plant in which a TIP level is being measured by the plant state monitoring unit 121, depending on the type of a to-be-monitored plant state signal, there are several patterns. Therefore, a process needs to be prepared for each type.

Figure 6:
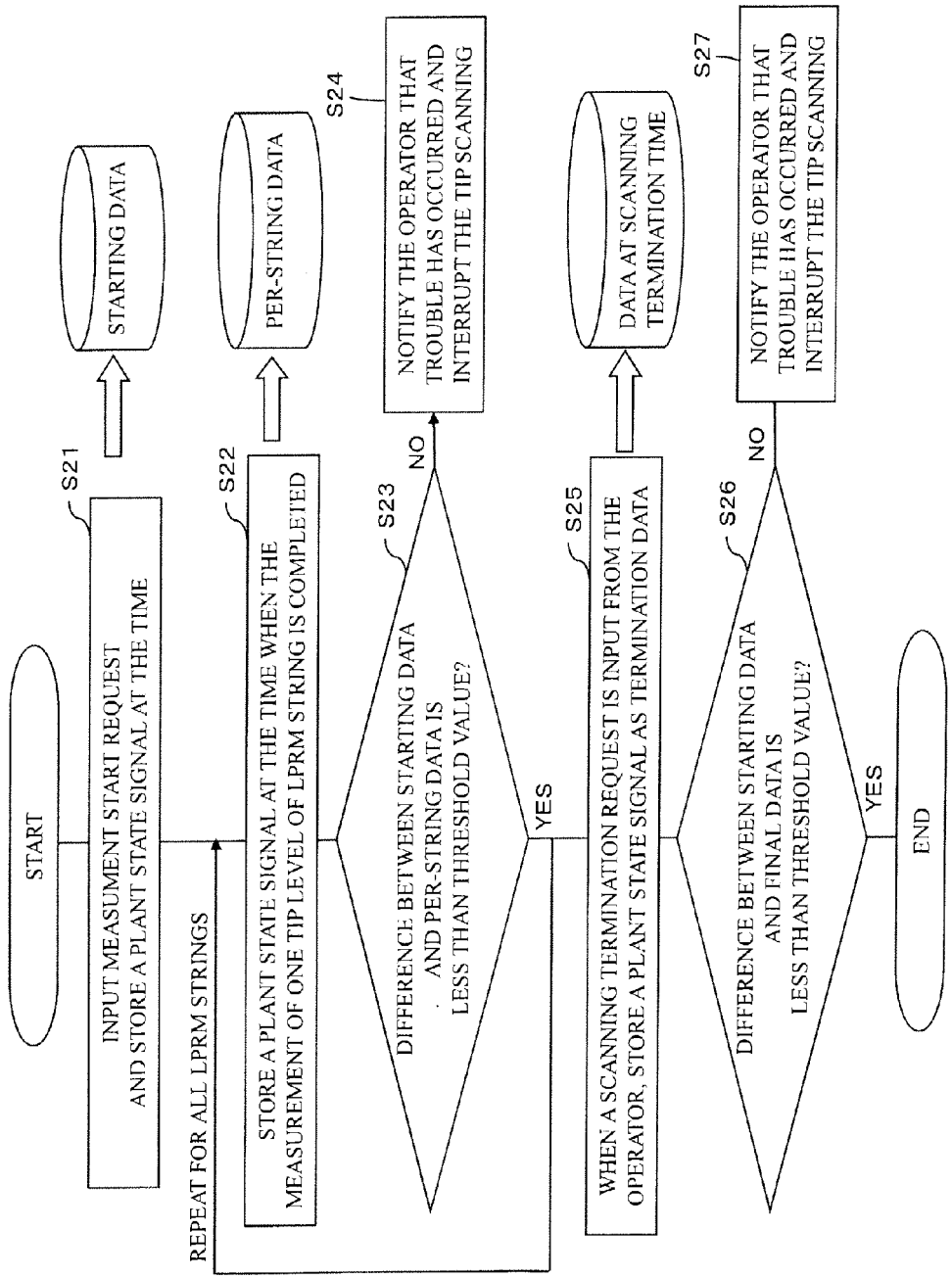
FIG. 6 is a flowchart showing the flow of process of monitoring the state of a plant in which a TIP level is being measured, or monitoring at a measurement start/end timing and monitoring at each LPRM string, according to the second embodiment.

FIG. 6 is a flowchart showing the flow of a process of monitoring the state of the plant in which a TIP level is being measured according to the present embodiment, i.e. the flow of a process of monitoring the plant's state at a timing when a TIP level of each LPRM string is measured during a period of time from when the measurement starts until the measurement comes to an end. The plant state signal is of a reactor thermal power, core flow rate, or control-rod position.

The flow of the process will be sequentially described below.

In the plant state monitoring unit 121, after a measurement start request is input from an operator, a plant state signal at the time is stored as starting data (Step S21).

Then, a plant state signal that comes after the measurement of a TIP level of one LPRM string is completed is stored as per-string data (Step S22). A determination is made as to whether the difference between the starting data and the per-string data is less than a certain threshold value (Step S23). The operations of steps S21 and S22 are repeated for all LPRM strings.

A determination is made as to whether the difference between the starting data and the per-string data exceeds a certain threshold value (Step S23). If the difference exceeds the threshold value, it is determined that trouble has occurred. The operator is notified of the fact via the TIP scanning unit 110, and the TIP scanning is interrupted (Step S24).

The above assessment process is performed every time TIP levels of all the LPRM strings are measured as shown in FIG. 6. A change of the plant state signal that is being measured is monitored.

When a scanning termination request is input from the operator, a plant state signal at the time is stored as terminating data (Step S25).

Then, a determination is made as to whether the difference between the starting data and the per-string data exceeds a certain threshold value (Step S26). If the difference exceeds the threshold value, the plant is decided as having trouble. The operator is notified of the fact via the TIP scanning unit 110 (Step S27).

Alternatively, in a process of monitoring the control-rod position, the following method may also be applicable: Based on the changed coordinates of a control rod 670 and the amount of change, an influence rate is calculated from an influence-rate evaluation table that is prepared in advance, and it is determined, depending on the influence rate, that trouble has occurred.

The present assessment process makes it possible to capture the power variation of the entire plant.

Figure 7:
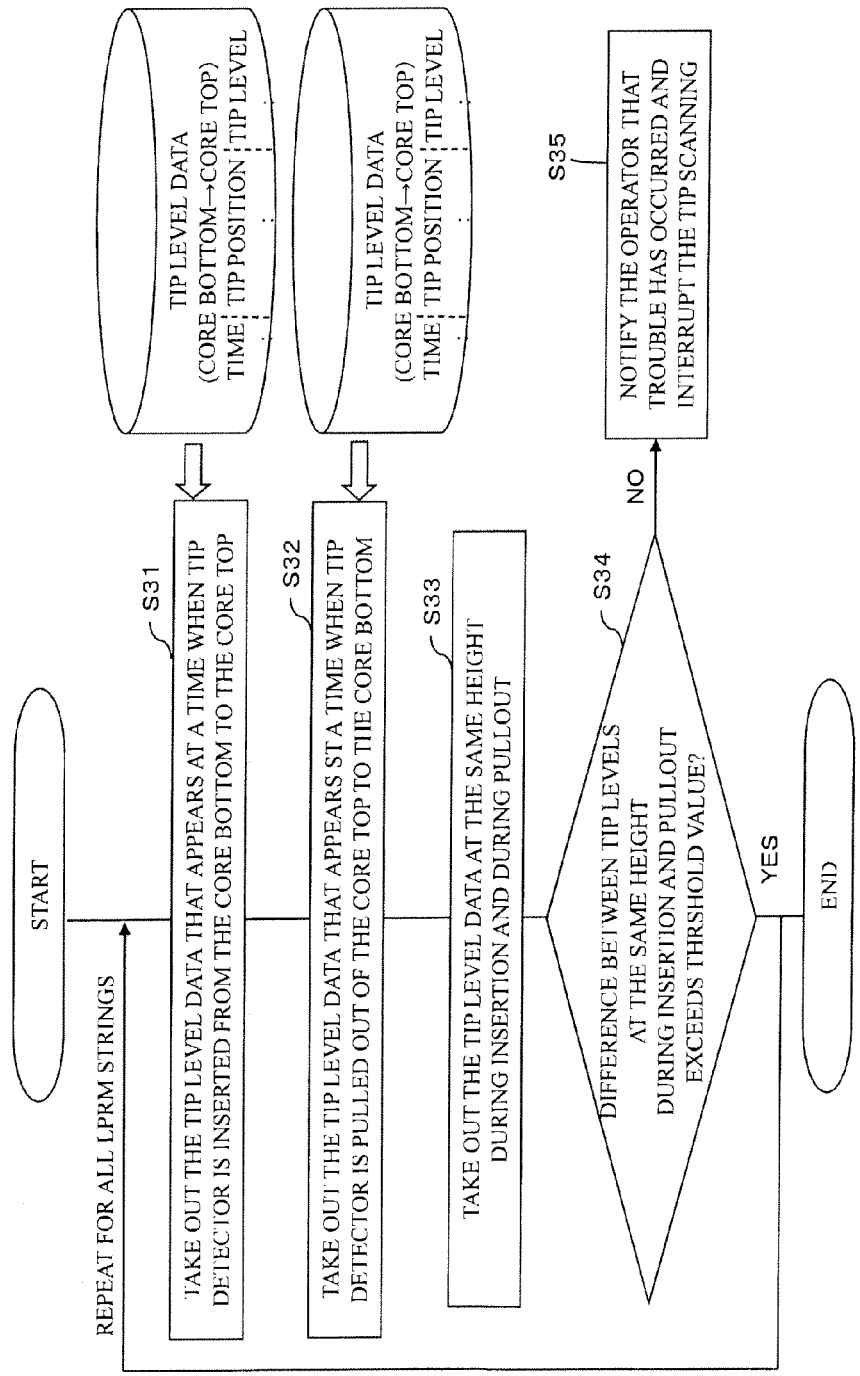
FIG. 7 is a flowchart showing the flow of a process of monitoring the state of a plant in which a TIP level is being measured, or monitoring of a TIP level, according to the second embodiment.

FIG. 7 is a flowchart showing the flow of a process by the plant state monitoring unit 121 that is measuring a TIP level according to the present embodiment, and shows a monitoring operation of a TIP level.

In the plant state monitoring unit 121, the TIP level data that appear at a time when the TIP detector is inserted from the core bottom to the core top and are in the TIP level data storage unit 112 are taken out (Step S31). Furthermore, the TIP level data that appear at a time when the TIP detector is pulled out of the core top to the core bottom are also taken out (Step S32).

The TIP level data at the same height during insertion and during pullout are taken out (Step S33).

A determination is made as to whether the difference between TIP levels at the same heights of the during insertion data and during pullout data is less than a threshold value (Step S34). If the difference is less than the threshold value at all heights, the operations of steps S31 to S33 are repeated.

The above assessment process is performed every time TIP levels of all LPRM strings are measured as shown in FIG. 7; and it is monitored whether the TIP levels are abnormal.

If the difference between TIP levels at the same height of the during-insertion data and the during-pullout data exceeds a certain threshold value at least at one height, it is determined that trouble has occurred in the measurement of the TIP level of the corresponding string. The operator is notified of the fact via the TIP scanning unit 110, and the TIP scanning is interrupted (Step S35).

The present assessment process makes it possible to accurately detect abnormal TIP levels.

Figure 8:
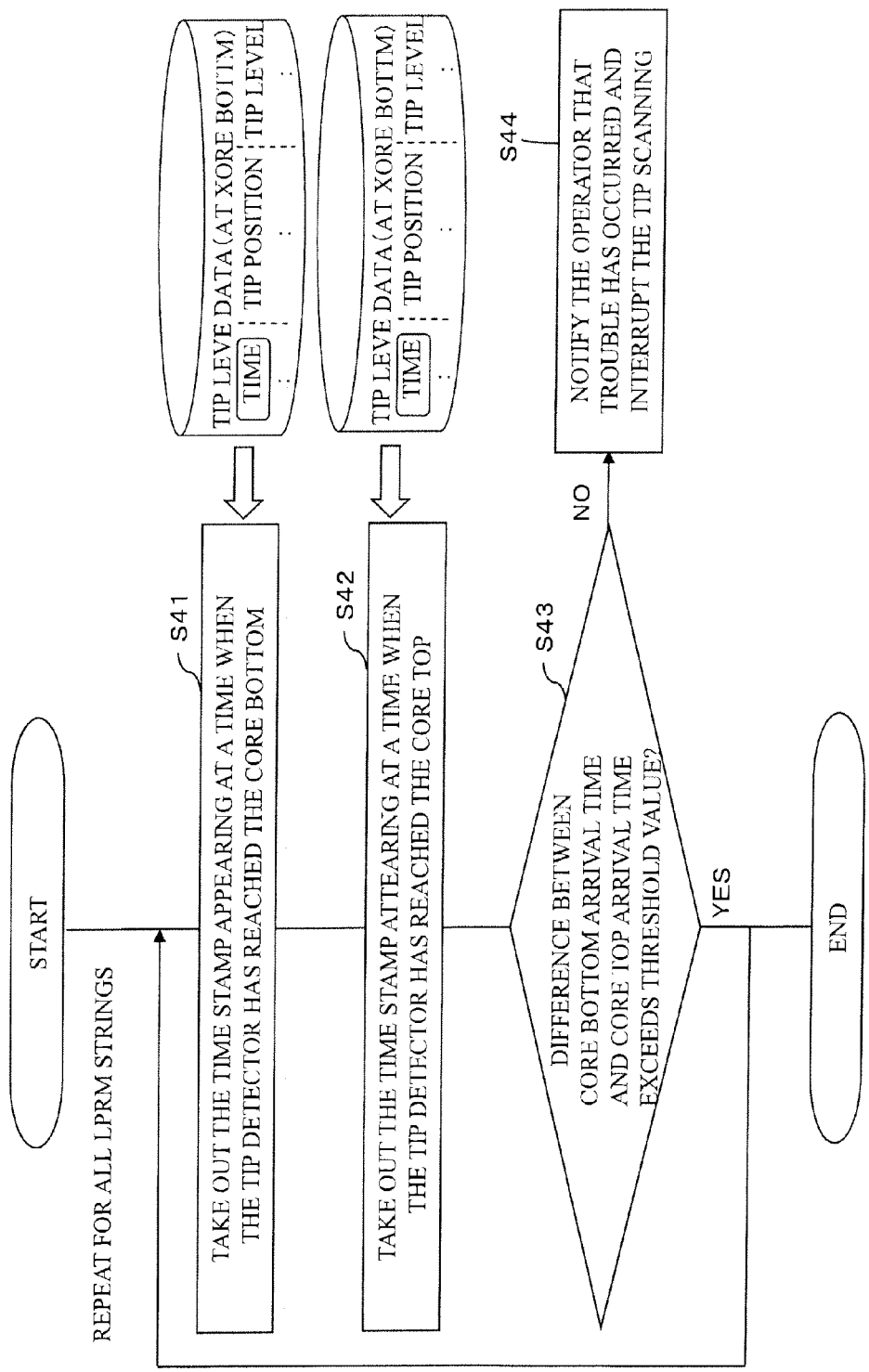
FIG. 8 is a flowchart showing the flow of a process of monitoring the state of a plant in which a TIP level is being measured, or monitoring of driving time of a TIP detector according to the second embodiment.

FIG. 8 is a flowchart showing the flow of a process of monitoring the state of the plant in which a TIP level is being measured according to the present embodiment, which is a process of monitoring the driving time of the TIP detector 540.

In the plant state monitoring unit 121, the time stamp of the TIP level data, which appear at a time when the TIP detector has reached the core bottom and are in the TIP level data storage unit 112, are taken out (Step S41). Then, the time stamp of the TIP level data that appear at a time when the TIP detector has reached the core top are taken out (Step S42).

While a determination is made as to whether the difference between the core-bottom arrival time and the core-top arrival time is less than a specified time length (Step S43), the operations of steps S41 and S42 are repeated for all LPRM strings.

If it is determined that the difference exceeds the specified time length, then it is determined that trouble has occurred in the measurement of a TIP level of the corresponding string. The operator is notified of the fact via the TIP scanning unit 110, and the TIP scanning is interrupted (Step S44).

As another monitoring parameter, the time needed for the TIP detector to be pulled out of the core top to the core bottom may also be available.

The present assessment process makes it possible to capture the abnormal driving state of the TIP detector.

According to the present embodiment, the plant state monitoring unit 121 in the process computer 100 monitors several types of plant state signals when a TIP level is being measured. When the reactor thermal power, core flow rate or control-rod position has changed, the operator is notified of the fact, or abnormal data are discarded. Therefore, it is possible to collect TIP level data in a way that properly reflects the current power distribution, as well as to prevent deterioration in the accuracy of reactor power distribution calculation.

Moreover, according to the present embodiment, as in the first embodiment, it is possible to provide a high-speed TIP monitoring control equipment that is not affected by the driving time of the TIP detector, a transfer lag of a signal, a delay of a timing at which the process computer detects that the pulse signal is ON, or the like.

[Third Embodiment]

Figure 9:
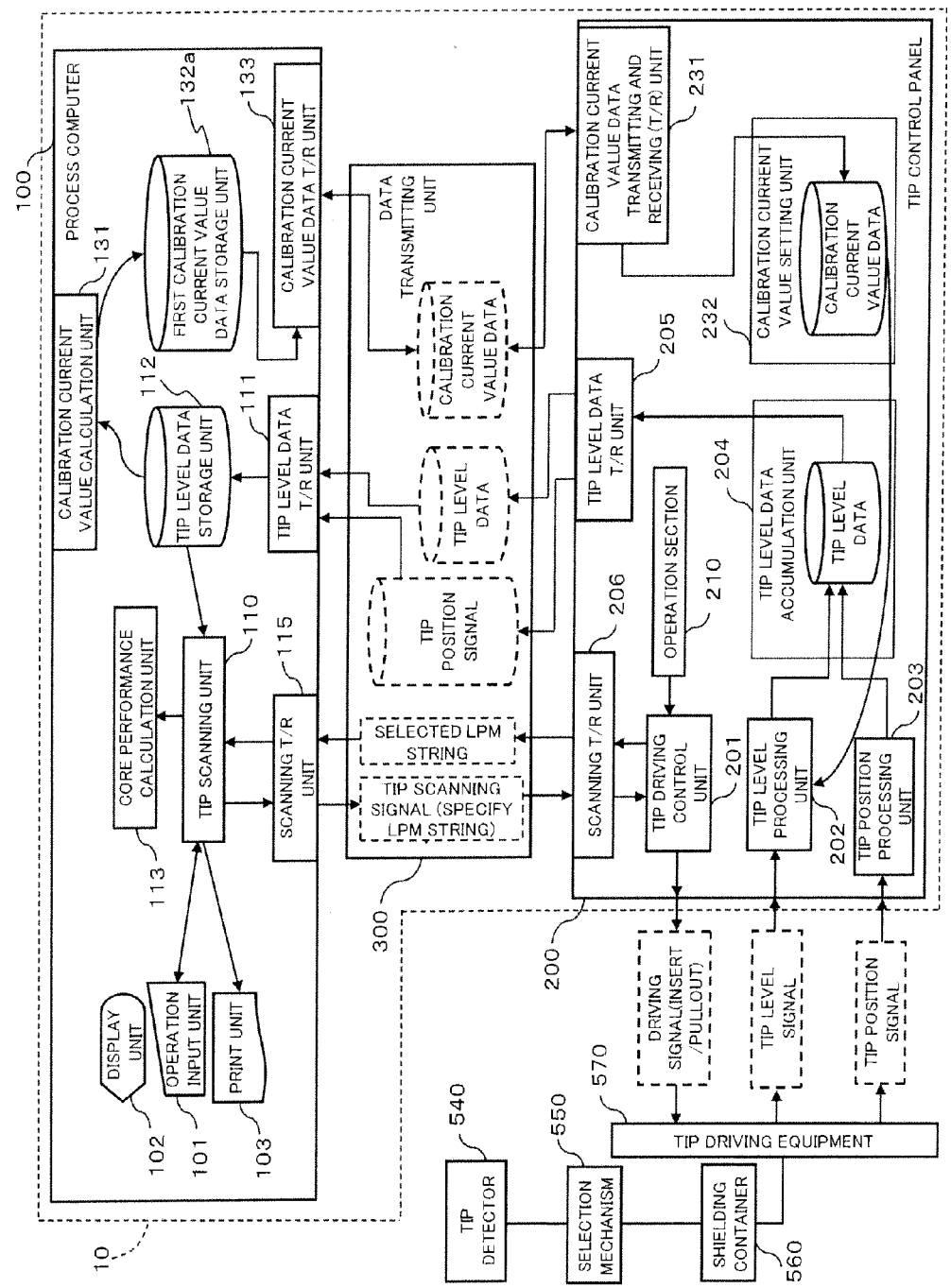
FIG. 9 is a block diagram showing the configuration of a third embodiment of a TIP system according to the present invention.

FIG. 9 is a block diagram showing the configuration of a third embodiment of a TIP system of the present invention.

The TIP system of the present embodiment is a variant of the first embodiment. The process computer 100 includes a calibration current value calculation unit 131, a first calibration current value data storage unit 132a, and a calibration current value data transmitting and receiving (T/R) unit 133. The TIP control panel 200 of the present embodiment includes a calibration current value data transmitting and receiving (T/R) unit 231 and a calibration current value setting unit 232.

The other components are substantially the same as those in the first embodiment.

In the process computer 100, the calibration current value calculation unit 131 calculates, on the basis of the value of a TIP level of a common string stored in the TIP level data storage unit 112, a calibration current value of the TIP detector 540. The first calibration current value data storage unit 132a stores, in the process computer 100, data of the calibration current value calculated by the calibration current value calculation unit 131.

The calibration current value data T/R unit 133 transmits the calibration current value data from the process computer 100 to the TIP control panel 200 via the data transmitting unit 300.

The calibration current value data T/R unit 231 receives the calibration current value data calculated by the process computer 100. The calibration current value setting unit 232 adjusts the gain of the TIP detector 540 in accordance with the calibration current value data T/R unit 231 of the TIP control panel 200 and the calibration current value.

A normal operation of the TIP monitoring control equipment 10 of the present embodiment will be described below.

In the calibration current value calculation unit 131 of the process computer 100, on the basis of the TIP level of a common string of the TIP level data storage unit 112 of the process computer 100, the calibration current value of the TIP detector 540 is calculated.

In this case, a common string is a common TIP guide tube 530 that enables all TIP detectors 540 to measure TIP levels, and is equivalent to No. 10 channel (LPRM string coordinates 32-33) in the conceptual diagram of the in-core arrangement of PPM strings of FIG. 16.

The calibration current value is a current value that is so set that the average of TIP level signals of common strings measured by the TIP detector 540 is 100 at a time when the reactor power is 100%, and is a value used to adjust the gain of the TIP detector 540 so that a TIP level signal is generated in accordance with the current reactor power.

The calibration current value needs to be set for each TIP detector 540. As the detector becomes deteriorated, a larger calibration current value is required to compensate for the deterioration.

Data of the calibration current value calculated by the calibration current value calculation unit 131 of the process computer 100 is stored in the first calibration current value data storage unit 132a of the process computer 100. The calibration current value data T/R unit 133 of the process computer 100 outputs the calibration current value data from the process computer 100 to the TIP control panel 200 via the data transmitting unit 300.

The calibration current value data T/R unit 231 of the TIP control panel 200 receives the calibration current value data transmitted from the process computer 100. The calibration current value data are output to the calibration current value setting unit 232 of the TIP control panel.

In the calibration current value setting unit 232, a TIP-level process that uses the calibration current value set in the TIP level processing unit 202 is performed, and the gain of the TIP detector is adjusted.

Moreover, according to the present embodiment, as in the first embodiment, it is possible to provide a high-speed TIP monitoring control equipment that is not affected by the driving time of the TIP detector, a transfer lag of a signal, a delay of a timing at which the process computer detects that the pulse signal is ON, or the like.

[Fourth Embodiment]

Figure 10:
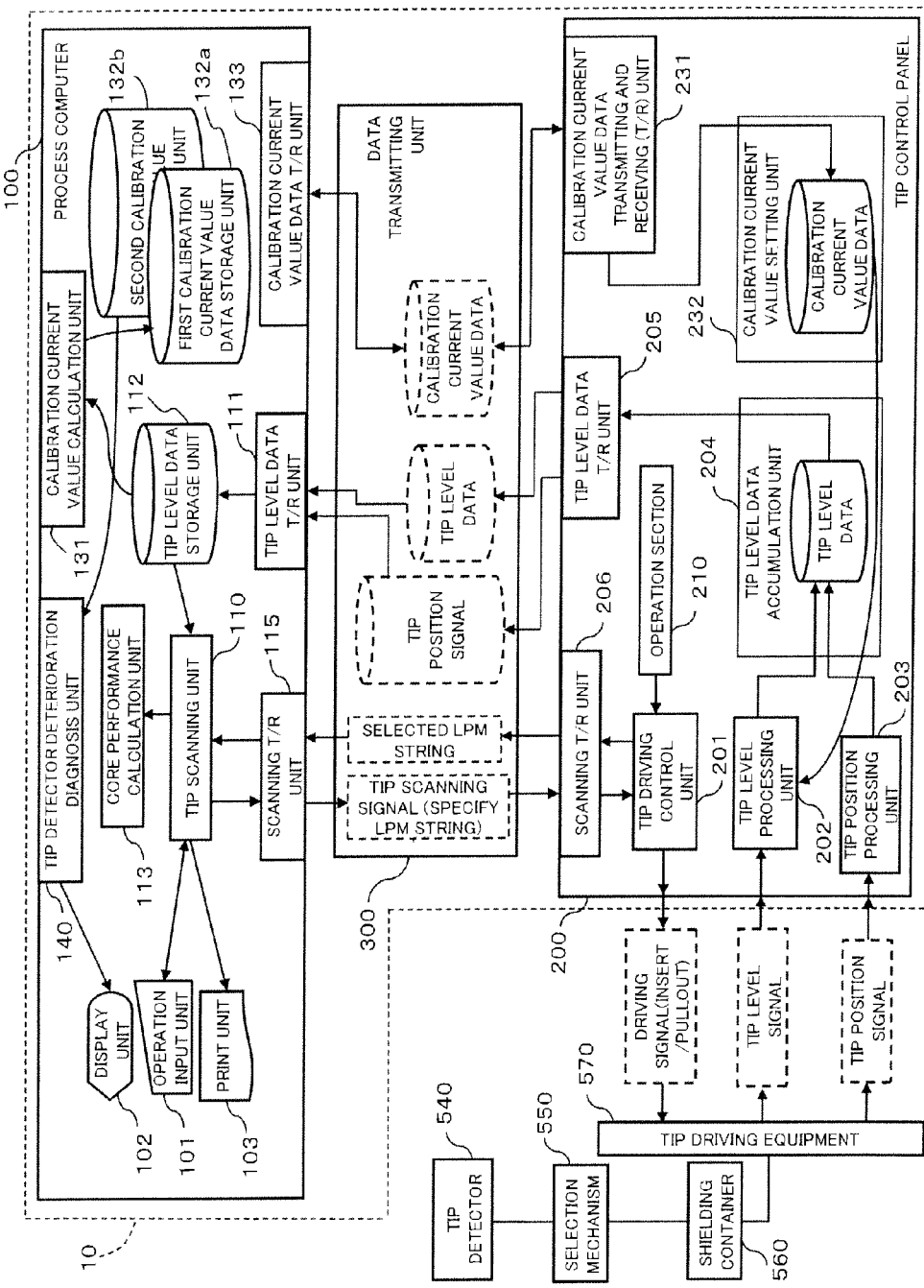
FIG. 10 is a block diagram showing the configuration of a fourth embodiment of a TIP system according to the present invention.

FIG. 10 is a block diagram showing the configuration of a fourth embodiment of a TIP system of the present invention.

The TIP system of the present embodiment is a variant of the third embodiment.

The present embodiment will be described based on FIG. 10.

As shown in FIG. 10, according to the present embodiment, in the process computer 100, a TIP detector deterioration diagnosis unit 140 is provided. The other components are substantially the same as those in the third embodiment.

When the measurement of a TIP level is performed, a calibration current value of the TIP detector 540 is calculated by the calibration current value calculation unit 131 of the process computer 100. In a second calibration current value data storage unit 132b of the process computer 100, the date and time when calibration takes place is added to data of the calculated calibration current value, and the data are stored and saved.

In the TIP detector deterioration diagnosis unit 140 of the process computer 100, a long-term deterioration trend of the calibration current value of each TIP detector 540 is determined from the second calibration current value data storage unit 132b. In the format that the operator desires, the trend is displayed on the display unit 102, and a log thereof is printed on the print unit 103, thereby notifying the operator.

Incidentally, as the format that the operator desires, for example, the following and other functions are conceivable: a function of plotting TIP gain data together with replacement recommendation gain and automatically notifying the operator of the fact that a replacement time has come; and a function of notifying, at a time when the deviation of gain between TIP machines becomes larger, the operator of trouble of the corresponding TIP detector 540.

Figure 11:
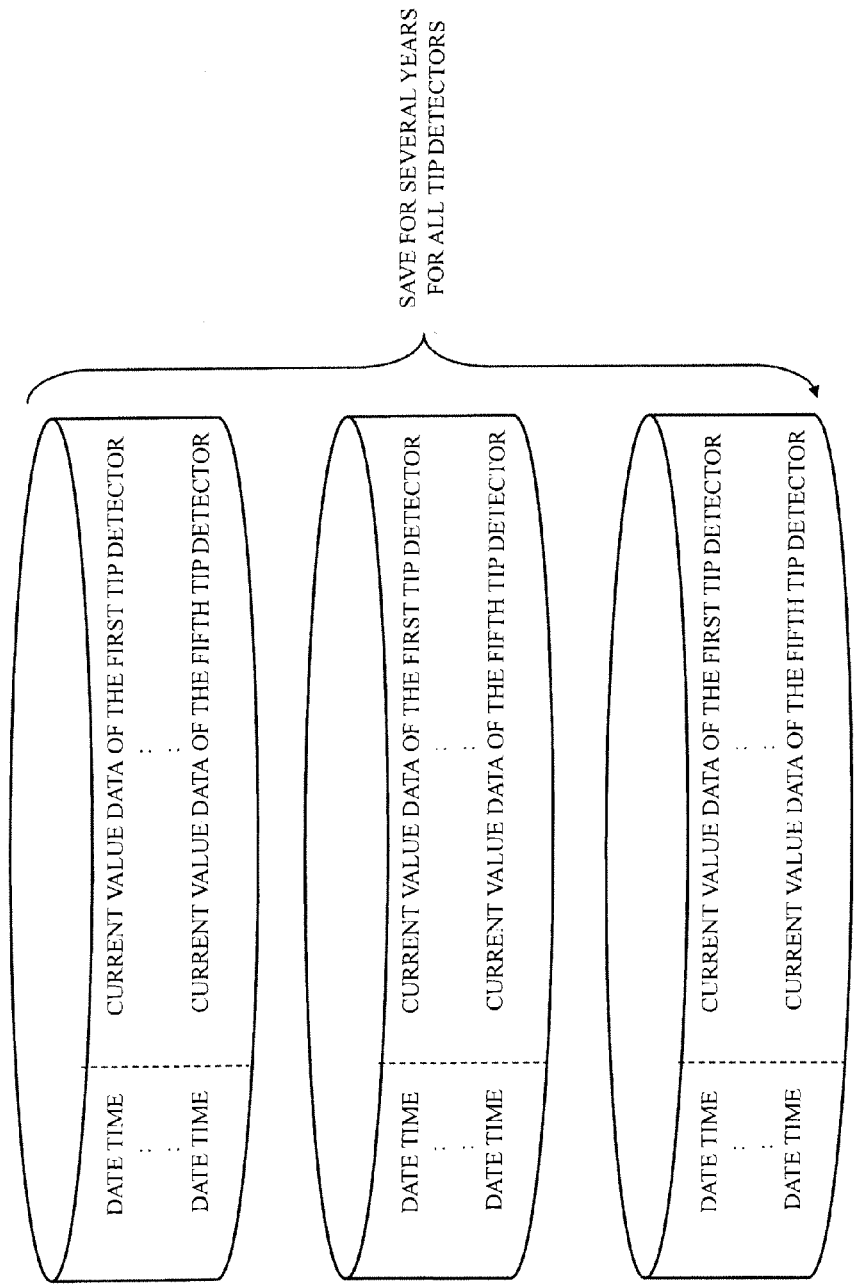
FIG. 11 is an explanatory diagram showing the configuration of a calibration current value data storage unit according to the fourth embodiment.

FIG. 11 is an explanatory diagram showing the configuration of the second calibration current value data storage unit 132b of the present embodiment.

Figure 12:
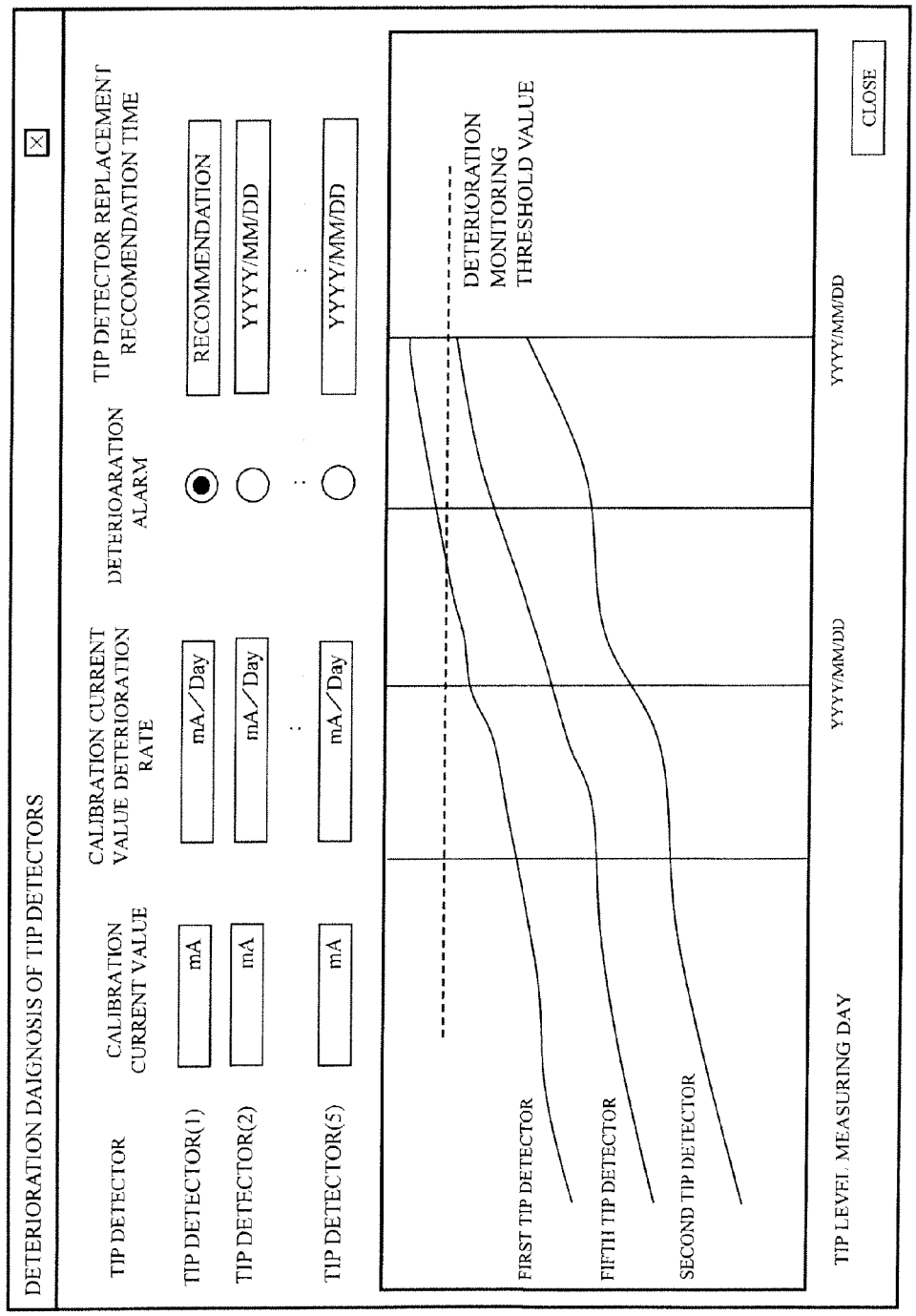
FIG. 12 is an explanatory diagram showing an example of a deterioration assessment screen of a TIP detector according to the fourth embodiment.
Figure 13:
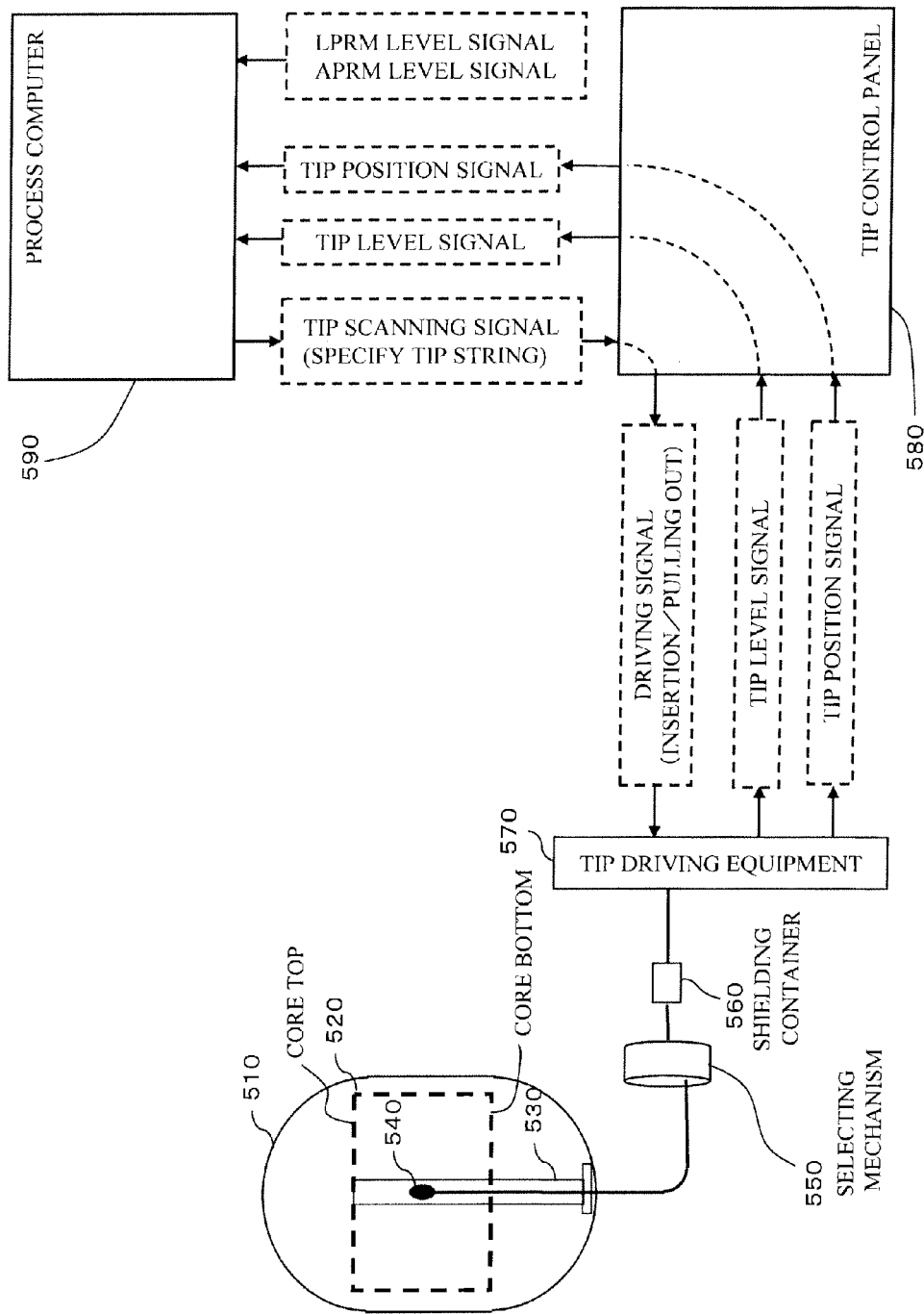
FIG. 13 is a block diagram showing the overall configuration of a conventional TIP system, as well as a nuclear reactor.

FIG. 12 is an explanatory diagram showing an example of a deterioration assessment screen of the TIP detector 540 by the TIP detector deterioration diagnosis unit 140 according to the present embodiment.

As for the configuration of the second calibration current value data storage unit 132b of the process computer 100, as shown in FIG. 10, the date and time when the calibration current value data are calculated and the calibration current value are saved as a pair of data for several years for all TIP detectors 540.

On the TIP detector deterioration diagnosis screen, a trend is displayed making it easier to visually confirm a long-term deterioration trend of the TIP detector 540; and, as information useful for making a plan of the replacement time of the TIP detector 540, a warning that is issued when the threshold value is exceeded, a replacement recommendation time that is calculated from a deterioration rate of the calibration current value, and the like are displayed.

According to the present embodiment, in addition to the same advantageous effects as those in the third embodiment, in the process computer 100, it is possible to determine a long-term deterioration trend of the TIP detector 540 by having a function of keeping the second calibration current value data storage unit 132b for a long period of time after the date and time data are added to the calibration current value data, and of displaying the TIP gain on the screen in the format that the operator desires, or printing on a printer, in the TIP detector deterioration diagnosis unit 140.

Thus, it is also possible to make a plan accurately of the replacement time of the TIP detector 540.

[Other Embodiments]

While certain embodiments have been described, these embodiments have been presented by way of example only, and are not intended to limit the scope of inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A TIP monitoring control system for controlling a TIP driving equipment that drives a TIP detector in a LPRM string, the TIP monitoring control system comprising: a process computer, a TIP control panel, and a data transmission unit configured to transmit data between the TIP control panel and the process computer, wherein the TIP control panel includes:

a TIP driving control unit that is programmed to input a TIP scanning signal and to output a driving signal to the TIP driving equipment, a TIP level processing unit that is programmed to input a TIP level signal from the TIP detector, a TIP position processing unit that is programmed to input a TIP position signal from the TIP driving equipment, a TIP level data accumulation unit that is programmed to input the TIP level signal and the TIP position signal and to accumulate the TIP level signal in synchronization with a TIP position signal as TIP level data, and a TIP level data transmitting unit that is programmed to constantly transmit the TIP position signal through the data transmission unit and to collectively transmit the TIP level data through the data transmission unit;

the process computer includes:

a TIP scanning unit that is programmed to output the TIP scanning signal, a TIP level data receiving unit that is programmed to receive 1) the TIP level data accumulated in the TIP control panel through the data transmission unit, 2) an LPRM level signal from an LPRM detector, and 3) an APRM level signal from an APRM, and receive the TIP position signal constantly, a TIP level data storage unit that is programmed to store the LPRM level signal and the APRM level signal in synchronization with the constantly received TIP position signal, and the TIP level data synchronized with the TIP position signal in the accumulation unit;

a calibration current value calculation unit that is programmed to calculate a calibration current value of a TIP detector on the basis of each TIP level data of a common string stored in the TIP level data storage unit, a first calibration current value data storage unit that is programmed to store calibration current value data calculated by the calibration current value calculation unit, and a first calibration current value data transmitting and receiving unit that is programmed to transmit calibration current value data from the process computer to the TIP control panel via the data transmission unit; and the TIP control panel further includes:

a second calibration current value data transmitting and receiving unit that is programmed to receive calibration current value data calculated by the process computer via the data transmission unit, and a calibration current value setting unit that is programmed to adjust gain of the TIP detector in accordance with a calibration current value.

2. The TIP monitoring control system according to claim 1, wherein the process computer further includes a plant state monitoring unit that is programmed to monitor parameters based upon a plant state signal, a TIP position signal stored in the TIP level data storage unit, and a TIP level signal that is in synchronization with the TIP position signal.

3. The TIP monitoring control system according to claim 1, wherein the process computer further includes:

a second calibration current value data storage unit in which information representing a time when calibration takes place is added to calibration current value data calculated by the calibration current value calculation unit before the calibration current value data are stored; and a TIP detector deterioration diagnosis unit that is programmed to determine a deterioration trend of the TIP detector from the calibration current value data storage unit and outputs the trend.

4. A TIP system comprising: a plurality of TIP detectors, a selection mechanism that sequentially selects one of a plurality of TIP guide tubes for each of the TIP detectors, a shielded container in which the TIP detectors are stored in any time other than a measurement period of the TIP detectors, a TIP driving equipment that drives the insertion and pullout of the TIP detectors into the TIP guide tubes, and a TIP monitoring control system, wherein the TIP monitoring control system has: a process computer, a TIP control panel, and a data transmission unit, the TIP control panel including:

a TIP driving control unit that is programmed to input a TIP scanning signal and to output a driving signal to the TIP driving equipment, a TIP level processing unit that is programmed to input a TIP level signal from the TIP detector, a TIP position processing unit that is programmed to input a TIP position signal from the TIP driving equipment, a TIP level data accumulation unit that is programmed to input the TIP level signal and the TIP position signal and to accumulate the TIP level signal in synchronization with a TIP position signal as TIP level data, and a TIP level data transmitting unit that is programmed to constantly transmit the TIP position signal through the data transmission unit and to collectively transmit the TIP level data through the data transmission unit;

the process computer including:

a TIP scanning unit that is programmed to output the TIP scanning signal, a TIP level data receiving unit that is programmed to receive 1) the TIP level data accumulated in the TIP control panel through the data transmission unit, 2) an LPRM level signal from an LPRM detector, and 3) an APRM level signal from an APRM, and receive the TIP position signal constantly, a TIP level data storage unit that is programmed to store the LPRM level signal and the APRM level signal in synchronization with the constantly received TIP position signal, and the TIP level data synchronized with the TIP position signal in the accumulation unit;

a calibration current value calculation unit that is programmed to calculate a calibration current value of a TIP detector on the basis of each TIP level data of a common string stored in the TIP level data storage unit, a first calibration current value data storage unit that is programmed to store calibration current value data calculated by the calibration current value calculation unit, and a first calibration current value data transmitting and receiving unit that is programmed to transmit calibration current value data from the process computer to the TIP control panel via the data transmission unit; and the TIP control panel further includes:

a second calibration current value data transmitting and receiving unit that is programmed to receive calibration current value data calculated by the process computer via the data transmission unit, and a calibration current value setting unit that is programmed to adjust gain of the TIP detector in accordance with a calibration current value.

\* \* \* \* \*